(12) United States Patent
Shizuo et al.

(10) Patent No.: US 8,356,983 B2
(45) Date of Patent: Jan. 22, 2013

(54) AIRFLOW CONTROL FOR VARIABLE SPEED BLOWERS

(75) Inventors: Otaki Shizuo, Kuala Lumpur (MY); Kok Keong Thoo, Selangor (MY)

(73) Assignee: OYL Research and Development Centre Sdn. Bhd., Sg. Buloh, Selangor Darul Ehsan ( * ) Notice: Subject to any disclaimer, the term of this patent is extended or adjusted under 35 U.S.C. 154(b) by 1264 days.

(21) Appl. No.: 12/116,498

(22) Filed: May 7, 2008

(65) Prior Publication Data

US 2009/0097988 A1    Apr. 16, 2009

(30) Foreign Application Priority Data

May 7, 2007 (MY) ................................ PI 20070702

(51) Int. Cl.
F04B 49/06 (2006.01)
(52) U.S. Cl. ........................... 417/42; 417/43; 417/44.11
(58) Field of Classification Search .................... 417/12, 417/42, 43, 44.11; 454/75, 256
See application file for complete search history.

(56) References Cited

U.S. PATENT DOCUMENTS

| | | | |
|---|---|---|---|
| 5,269,660 A * | 12/1993 | Pradelle | 417/18 |
| 5,736,823 A * | 4/1998 | Nordby et al. | 318/432 |
| 6,504,338 B1 * | 1/2003 | Eichorn | 318/727 |
| 7,191,316 B2 * | 3/2007 | Sugumar et al. | 712/222 |
| 2004/0062658 A1 * | 4/2004 | Beck et al. | 417/42 |
| 2006/0099084 A1 * | 5/2006 | Otaki et al. | 417/42 |

FOREIGN PATENT DOCUMENTS

| | | |
|---|---|---|
| DE | 29914892 U1 | 2/2000 |
| EP | 681150 A2 | 11/1995 |
| EP | 945623 A2 | 9/1999 |

OTHER PUBLICATIONS

European Examiner Dominique Lienhard, Communication enclosing Partial European Search Report for EP 08 25 1624.6 dated Mar. 29, 2011, 2 pages.

* cited by examiner

*Primary Examiner* — Charles Freay
(74) *Attorney, Agent, or Firm* — Fish & Richardson P.C.

(57) ABSTRACT

An apparatus for controlling an air distribution system by controlling the speed of a motor associated with a blower to maintain a rate of air flow in the system at substantially a target air flow rate. The apparatus comprises means for controlling a supplied frequency to the motor; means for providing a speed signal representative of the speed of motor; means for providing a frequency signal representative of the supplied frequency from a controller to the motor; means for providing a load signal representative of the load of the motor; means for calculating an air flow rate signal based on the speed signal and the load signal; means for controlling a supplied frequency in response to the target air flow rate signal and the calculated air flow rate signal. The apparatus can apply three different types of algorithm for controlling and compensating the motor.

19 Claims, 8 Drawing Sheets

AIRFLOW CONTROL FOR VARIABLE SPEED BLOWERS

FIELD OF THE INVENTION

This invention relates generally to systems for conditioning air and specifically to control system for maintaining a desired flow rate of conditioned air through at least part of the system regardless of the static pressure therein.

DESCRIPTION OF THE BACKGROUND ART

In the past, various different techniques have been used in an attempt to flow air through a contained space of a system including air distribution systems for conditioning the temperature of the air with the rate of such air flow being related to the static pressure in the system. The rate of air flow (CFM-cubic feet per minute) through the air distribution system also affects the speed and torque of a motor used in the system.

One approach of the past involved the laborious task of matching the motor speed and torque with the proper fan to approximate the desired air flow rate for the particular contained space and static pressure of the particular air distribution system. However, this did not accommodate variations in the static pressure in the air distribution system caused by alterations in the system such as opening, closing or adjusting of a damper connecting a conditioned space in air flow relation with the system. In addition, other devices, such as filter and heat exchangers, may alter the static pressure within the duct system.

If the fan or blower utilized in such prior art systems was of the fan or blade type, an increase in the static pressure acting on such fan resulted in decrease in the air flow rate.

Another prior art approach has been to compensate for the alteration in the speed of fans and the electric motors by employing an apparatus for controlling the motor speed which required the calculation of constants specific for each apparatus and air distribution system combination. This apparatus was included in a controller which drives the motor at various speed but was in case of a synchronous motor and actual motor speed is equal to supplied frequency from an inverter to a motor. If an induction motor and AC inverter controller are used, actual motor speed is different from supplied frequency and a slip that is difference in speed between actual motor speed and supplied frequency depends on resistance to have to be taken into account.

It is an object of the present invention to provide an improved system for conditioning air and for maintaining a pre-selected airflow rate of conditioned air through at least part of the system regardless of the static pressure therein.

It is a further object of the present invention to provide an improved airflow control system, which can be utilised in conjunction with numerous duct systems without the need for calibration particular to the specific duct system.

It is another object of the present invention to provide an improved method, which directly calculates the actual airflow of the air distribution system.

It is yet another object of the present invention to provide an improved method for applying to a combination of induction motor and AC inverter controller which is cheaper than a combination of synchronous motor and DC inverter controller.

SUMMARY OF THE INVENTION

These and other objects of the present invention are achieved by the following:

In one embodiment of the present invention an apparatus for controlling an air distribution system of the type which includes a duct system, a motor drivingly associated with a blower and a target air flow rate signal which represents a target air flow for the air distribution system, the apparatus providing control of the motor speed to maintain a rate of air flow in the system at substantially the target air flow rate, characterised in that the apparatus comprises means for controlling a supplied frequency to the motor to achieve provisional frequency; means for providing a speed signal representative of the speed of the motor; means for providing a frequency signal wherein the frequency is being supplied from a controller to the motor; means for providing a load signal relatively representative of the load of the motor; means for calculating an air flow rate signal by using the speed signal and with the load signal; means for controlling a supplied frequency in response to the target air flow rate signal and the calculated air flow rate signal for drawing the air flow rate to the target air flow rate.

In another embodiment of the present invention an apparatus for controlling an air distribution system of the type which includes a duct system, a motor drivingly associated with a blower and a target air flow rate signal which represents a target air flow for the air distribution system, the apparatus providing control of the motor speed to maintain a rate of air flow in the system at substantially the target air flow rate, wherein the apparatus comprises means for controlling a supplied frequency to the motor to the provisional frequency; means for providing a speed signal representative of the speed of motor; means for providing a frequency signal representative of the supplied frequency from the controller to the motor; means for providing a load signal relatively representative of the load of the motor; means for calculating an air flow rate signal by the speed signal and the load signal; means for calculating a target frequency by the air flow rate and the target air flow rate; means for controlling the supplied frequency to the target frequency.

In yet another embodiment of the present invention an apparatus for controlling an air distribution system of the type which includes a duct system, a motor drivingly associated with a blower and a target air flow rate signal which represents a target air flow for the air distribution system, the apparatus providing control of the motor speed to maintain a rate of air flow in the system at substantially the target air flow rate, wherein the apparatus comprises means for controlling a supplied frequency to the motor to the provisional frequency; means for providing a speed signal representative of the speed of motor; means for providing a frequency signal representative of the supplied frequency from the controller to the motor; means for calculating a slip signal by the speed signal and the frequency signal; means for controlling a supplied voltage signal in response to a slip signal wherein the supplied voltage signal representative of the input voltage of the motor and is controlled for maintaining the slip signal at previously set value; means for providing a load signal relatively representative of the load of the motor; means for calculating an air flow rate signal by the speed signal and the load signal; means for controlling a supplied frequency in response to the target air flow rate signal and the calculated air flow rate signal for drawing the air flow rate to the target air flow rate.

In yet another embodiment of the present invention an apparatus for controlling an air distribution system of the type which includes a duct system, a motor drivingly associated with a blower and a target air flow rate signal which represents a target air flow for the air distribution system, the apparatus providing control of the motor speed to maintain a rate of air flow in the system at substantially the target air flow rate, wherein the apparatus comprises means for controlling a supplied frequency to the motor to the provisional frequency; means for providing a speed signal representative of the speed of motor; means for providing a frequency signal representative of the supplied frequency from the controller to the motor; means for calculating a slip signal by the speed signal and the frequency signal; means for controlling a supplied voltage signal in response to a slip signal wherein the supplied voltage signal representative of the input voltage of the motor and is controlled for maintaining the slip signal at previously set value; means for providing a load signal relatively representative of the load of the motor; means for calculating an air flow rate signal by the speed signal and the load signal; means for calculating a target frequency by the air flow rate and the target air flow rate; means for controlling the supplied frequency to the target frequency.

In another embodiment of the present invention an apparatus for controlling an air distribution system of the type which includes a duct system, a motor drivingly associated with a blower and a target air flow rate signal which represents a target air flow for the air distribution system, the apparatus providing control of the motor speed to maintain a rate of air flow in the system at substantially the target air flow rate, wherein the apparatus comprises means for controlling a supplied frequency to the motor to the provisional frequency; means for providing a speed signal $R_a$ representative of the speed of motor; means for providing a frequency signal representative of the supplied frequency from the controller to the motor; means for calculating a supplied voltage signal in response to the frequency signal wherein the supplied voltage signal representative of the input voltage of the motor; means for providing a supplied voltage signal to be calculated; means for calculating a speed signal $R_t$ in response to the frequency signal; means for controlling a supplied frequency by comparison between a speed signal $R_a$ and a speed signal $R_t$.

The foregoing and other objects, features and advantages of the present invention will become more apparent in light of the following detail description and accompanying drawings.

BRIEF DESCRIPTION OF THE DRAWINGS

The novel features that are considered characteristics of the invention are set forth with particularity in the appended claims. The invention itself, however, both as to its organization and method of operation, together with additional objects and advantages thereof, will best be understood from the following description of the preferred embodiment when read in connection with the accompanying drawing wherein like numbers have been employed in the different figures to denote the same part, and wherein;

FIG. 2-1 is a flow diagram of fixed Voltage-Frequency characteristics of one preferred embodiment of the present invention.

FIG. 2-2 is a flow diagram of fixed Voltage-Frequency characteristics of another alternative preferred embodiment of the present invention.

FIG. 3-1 is a flow diagram of fixed slip by voltage control of one preferred embodiment of the present invention.

FIG. 3-2 is a flow diagram of fixed slip by voltage control of another alternative preferred embodiment of the present invention.

FIG. 4-1 is a flow diagram of maximum efficiency point of one preferred embodiment of the present invention.

FIG. 4-2 is a graph of voltage-inverter frequency curve for maximum efficiency point of FIG. 4-1.

FIG. 4-3 is a graph of revolution-inverter frequency curve for maximum efficiency point of FIG. 4-1.

DETAILED DESCRIPTION OF THE PREFERRED EMBODIMENT

Figure 1:
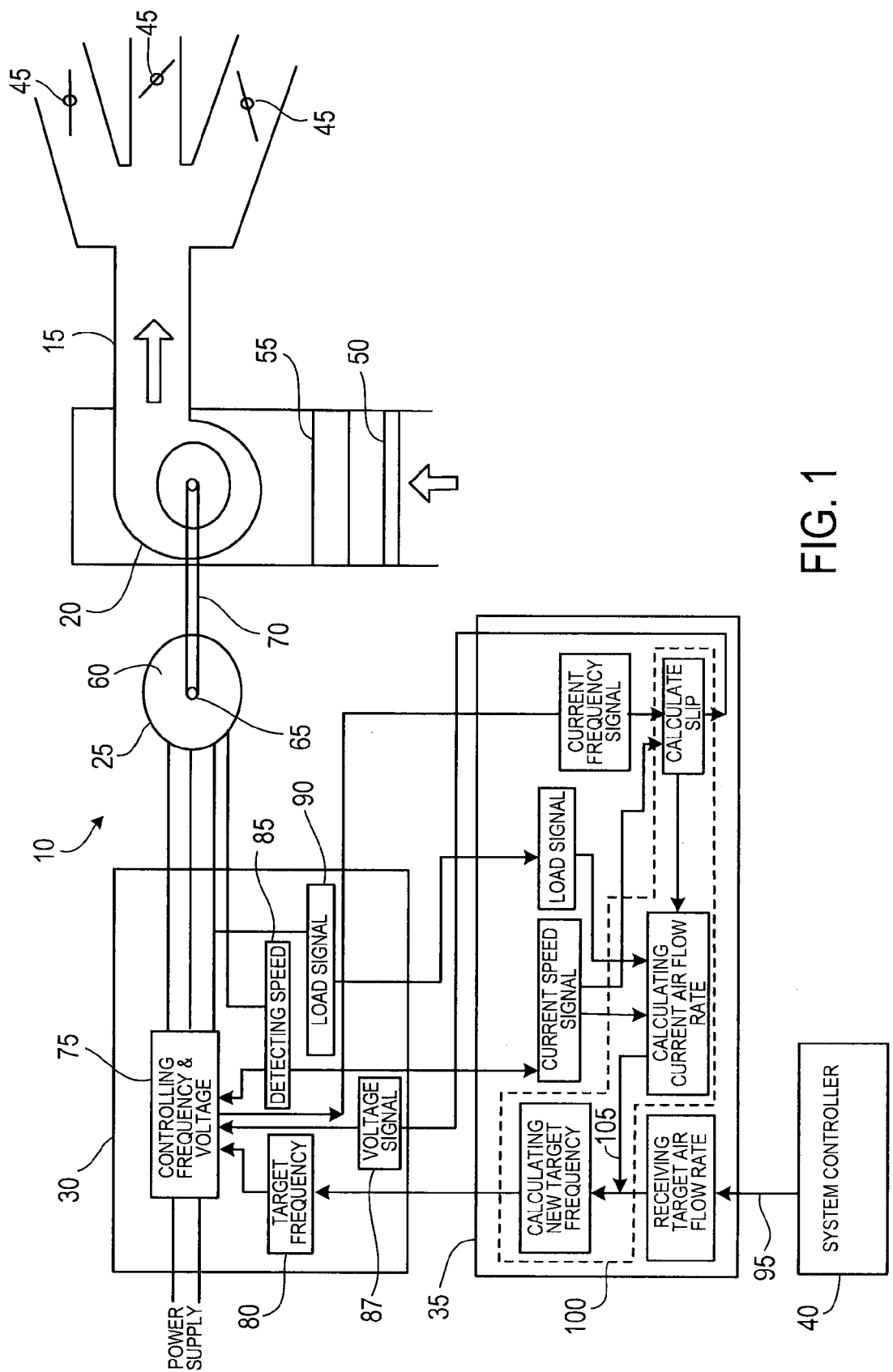
FIG. 1 is a diagram of an air distribution system including a preferred embodiment of the present invention.

Referring now in detail to the drawings, FIG. 1 is a block diagram of an air distribution system 10 of one preferred embodiment of the present invention. The major components of the air distribution system 10 including the present invention comprise a duct system 15, a blower 20, a motor 25, a variable speed motor controller 30, an air flow control module 35, and a system control 40.

The duct system 15 is a conduit used for distributing air to the desired zone to be conditioned. For example, the duct system 15 may be installed in a building for providing conditioned air to desired rooms therein. As mentioned above, the static pressure within the duct system 15 is affected by dampers 45, filter 50, and heat exchangers 55 which are incorporated in the duct system 15.

The blower 20 is a device, such as a fan, for causing air to flow for the duct system 15 and is typically installed therein. In one preferred embodiment, the blower 20 comprises a forward curved centrifugal fan. However, the blower 20 may be any type of blade, fan, or other device for moving air in an air distribution system 10.

The motor 25 is a device for providing the necessary mechanical power for driving the blower 20. In one preferred embodiment, the motor 25 includes a stationary assembly 60 with a plurality of winding stages for carrying motor current and further includes a rotational assembly 65 in driving relationship with the blower 20. The motor 25 may be any device capable of driving the blower 20 such as an induction motor. The motor 25 is drivingly connected to the blower 20 by pulley system 70. Alternatively, the motor 25 and the blower 20 may be an integrated device such that the motor 25 is inserted into the blower 20, attached with a set screw, and electrically connected therein (not shown).

The variable speed motor controller 30 is a means for controlling the motor speed in response to a target frequency signal 80 generated by the air flow control module 35, a means for controlling the voltage in response to the voltage signal 87, a means for providing a speed signal 85 representative of the speed of the motor 25 and a means for providing a load signal 90 relatively representative of the torque of motor. The speed signal 85 may be provided by a device to count pulse sent from hall sensor or optical sensor. The load signal 90 may be provided by either a device to represent a voltage to be supplied to the motor 25 or a device to represent a current to be supplied to the motor 25. The variable speed motor controller 30 is a type of frequency and voltage control, is responsive to a target frequency signal 80 and control a voltage of input to the motor 25 responsively to voltage signal 87.

The variable speed motor controller 30 is electrically connected to the airflow control module 35 for receiving the target speed signal 80 and for sending the speed signal 85 and the load signal 90.

The variable speed motor controller 30 is also electrically connected to the motor 25 for applying a frequency and a voltage to one or more of the winding stages at a time. Accordingly, the variable speed motor controller 30 controls the speed of the motor 25 in response to the target frequency signal 80 provided by the airflow control module 35.

The air flow control module 35 is a means for providing a target frequency signal 80 in response to a target air flow rate signal 95, a speed signal 85 and a load signal 90 as will be explained herein below. The target air flow rate signal 95 is generated by the system control 40. The speed signal 85 and the load signal 90 are generated by the variable speed motor controller 30. The air flow control module 35 comprises a microprocessor 100 for calculating an air flow rate signal 105 by the speed signal 85 and the load signal 90 and for calculating the target frequency signal 80 by the target air flow rate signal 95, a speed signal 85 and the air flow rate signal 105.

The system control 40 is a device or system which supplies the air flow control 35 with a target flow rate signal 95 representative of desired air flow rate. The system control 40 may be responsive to sensors and user input (not shown).

The airflow control module 35 operates in accordance with a constant airflow algorithm for controlling and compensating the motor speed. This algorithm allows the motor 25 to provide a constant air flow within the air distribution system 10 regardless of variations in static pressure. Controlling the motor 25 in this manner provides enhanced independence of the air flow rate to the static pressure within the air distribution system 10. The constant airflow algorithm demonstrates the cooperation of the present invention and is described herein below.

There are three types of algorithm for controlling and compensating the motor speed by ways of fixed Voltage-Frequency characteristic, fixed slip by voltage control and maximum efficiency point.

Figures 1, 2:
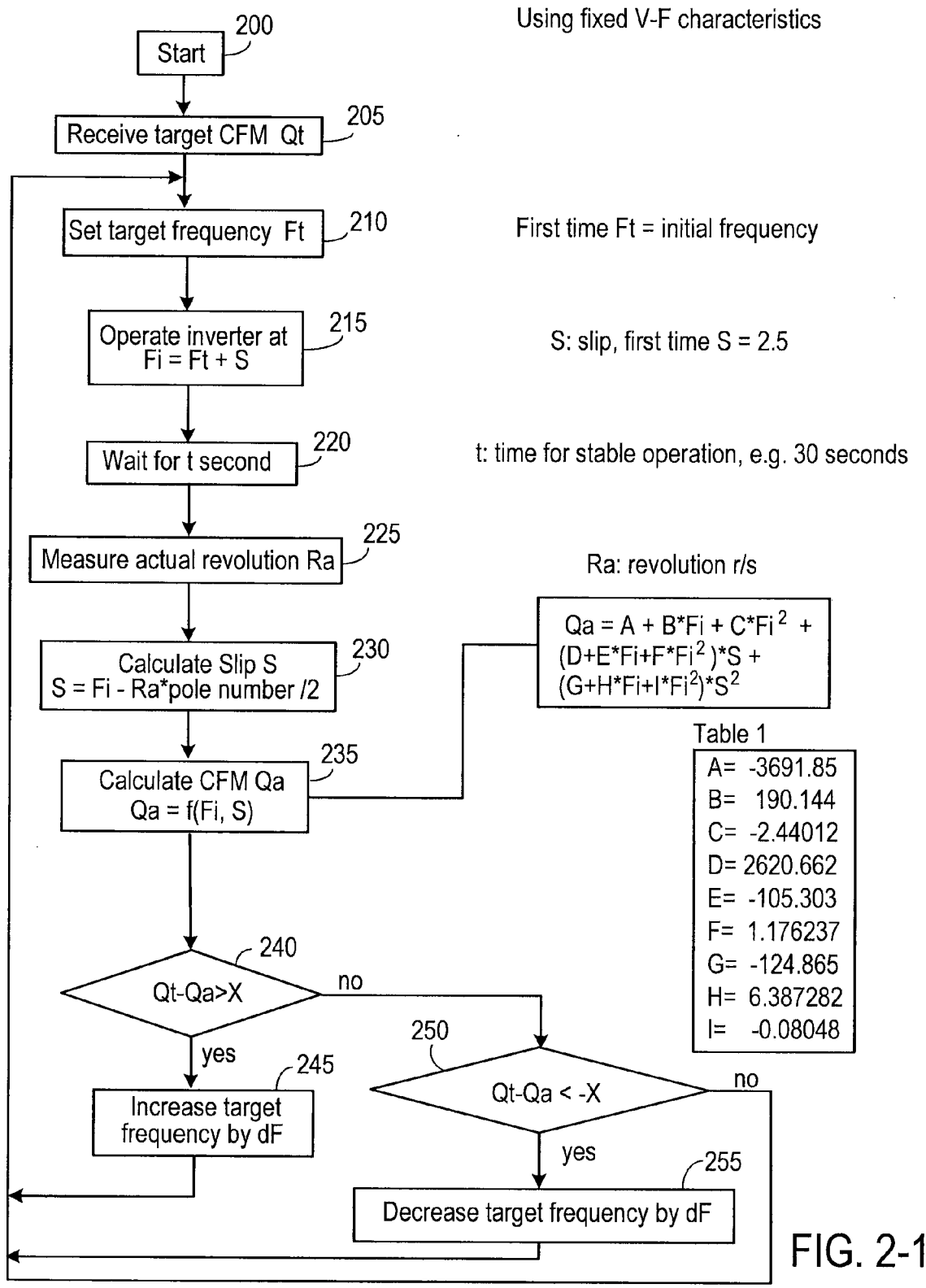
Figure 2:
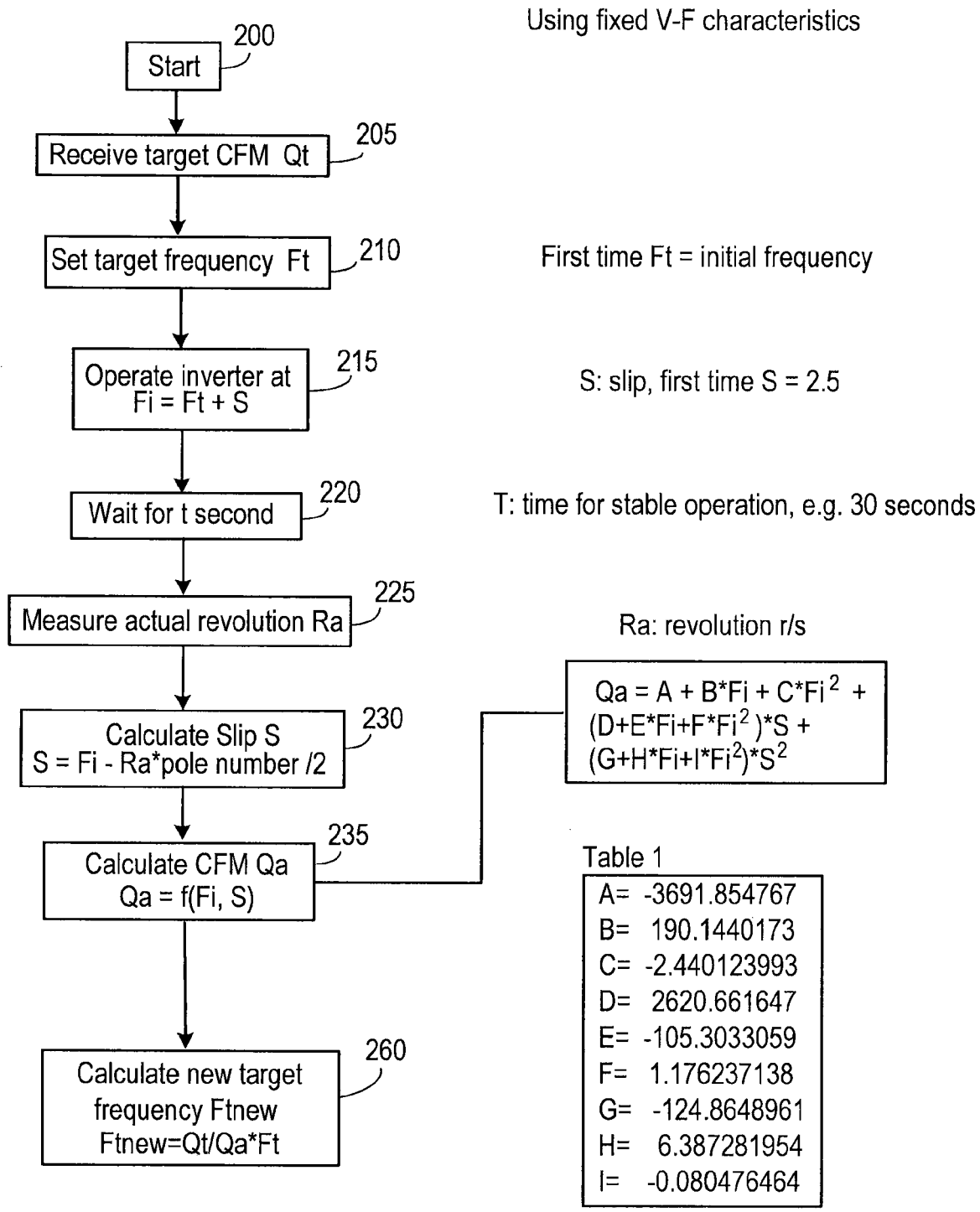

FIG. 2-1 shows a flow diagram of fixed Voltage-Frequency characteristics of one preferred embodiment of the present invention. It begins at block 200 labelled as "start" followed by first step 205 to receive a target air flow rate signal, $Q_t$ from the system controller 40. In step 210, an initial frequency is set which can be any initial target frequency Ft or a final frequency in the last operation. In step 215, the inverter operates at Ft+S where S represents the motor slip. The initial slip is set at 2.5 Hz. In the next step 220, the air flow control module 35 is being set to wait for t seconds which is time taken for motor speed to be stable before taking step 226 in measuring the motor revolution, $R_a$. This is followed by step 230 where the actual slip is calculated. In step 235, the microprocessor 100 calculates an air flow rate signal $Q_a$ by the frequency Fi, and the slip S using the following algorithm:

$$Q_a = A + B*Fi + C*Fi^2 + (D + E*Fi + F*Fi^2)*S + (G + H*Fi + I*Fi^2)*S^2,$$

wherein $Q_a$ is the actual air flow rate signal,

Fi is the present value of the motor frequency,

S is the present motor slip and

A to I are constants shown in Table 1 representing characteristics of the blower 20, the motor 25 and the variable speed motor controller 30.

In step 240, the microprocessor 100 compares a target airflow rate signal, $Q_t$ with the actual airflow rate signal $Q_a$. If $Q_t-Q_a>X$ then step 245 an increase in target frequency dF takes place while if step 250, $Q_t-Q_a<-X$ then step 255 a decrease in target frequency takes place. When $|Q_t-Q_a|<=X$ no adjustment is required step 210 takes place and the cycle is repeated. X is the desired tolerance of air flow rate. After step 245 or step 255, the microprocessor 100 also return to step 210 to set target frequency, $F_t$ and repeat the cycle again. Steps 240 to 255 can be reduced to one step 260 where new target frequency, $F_t$ is calculated using the following algorithm as shown in FIG. 2-2:

$$F_{tnew} = Q_t/Q_a * F_t$$

In this algorithm, $Q_a$ is calculated by the frequency $F_i$ and the slip S but if the input of inverter as load signal 90 is used instead of the slip, the same results can be achieved. Thus the air distribution system 10 operates to maintain a pre-selected air flow rate $Q_t$. If motor revolution $R_a$ is used in $Q_a$ calculation algorithm instead of $F_i$ the same results can be achieved.

Figures 1, 3:
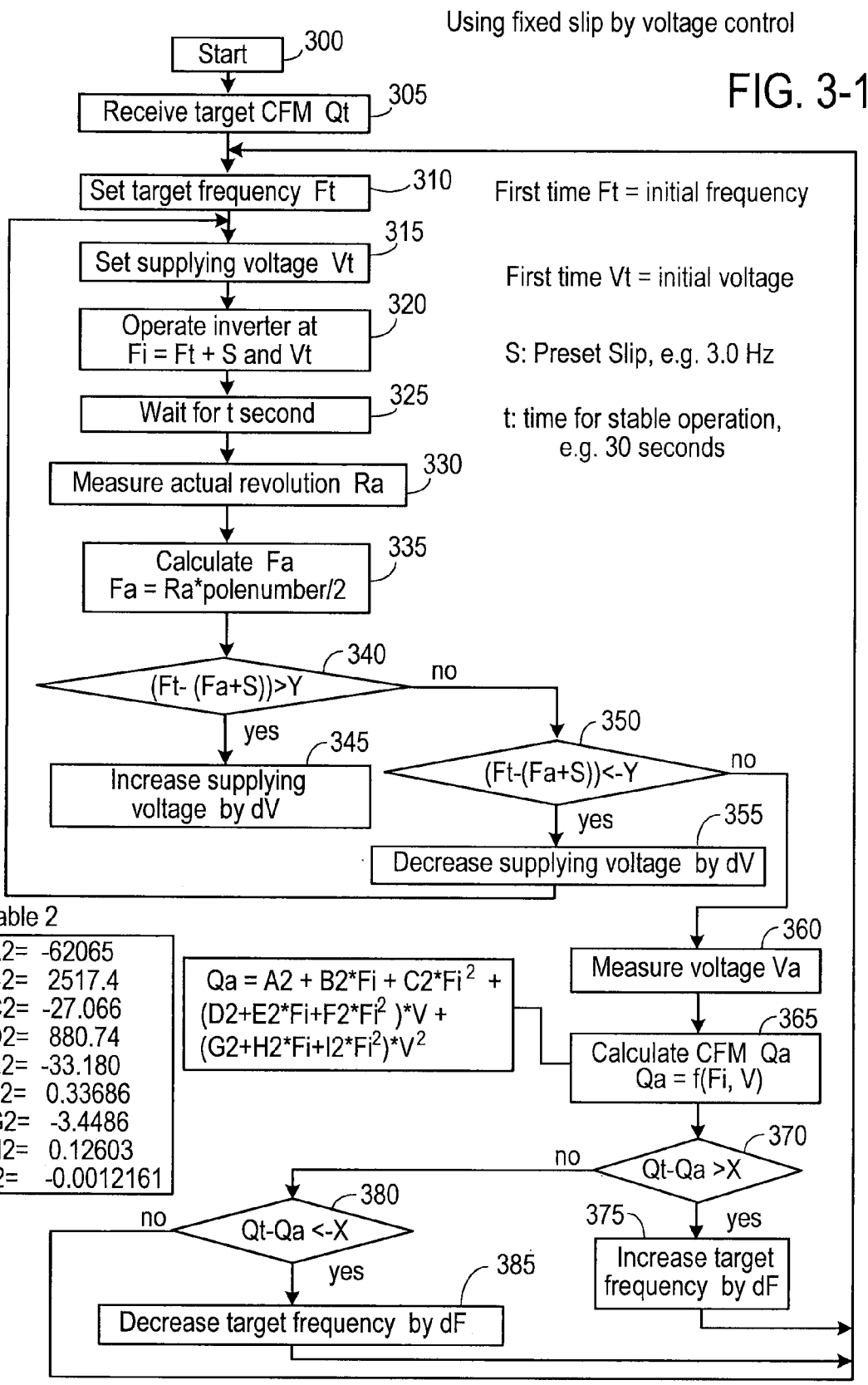
Figures 2, 3:
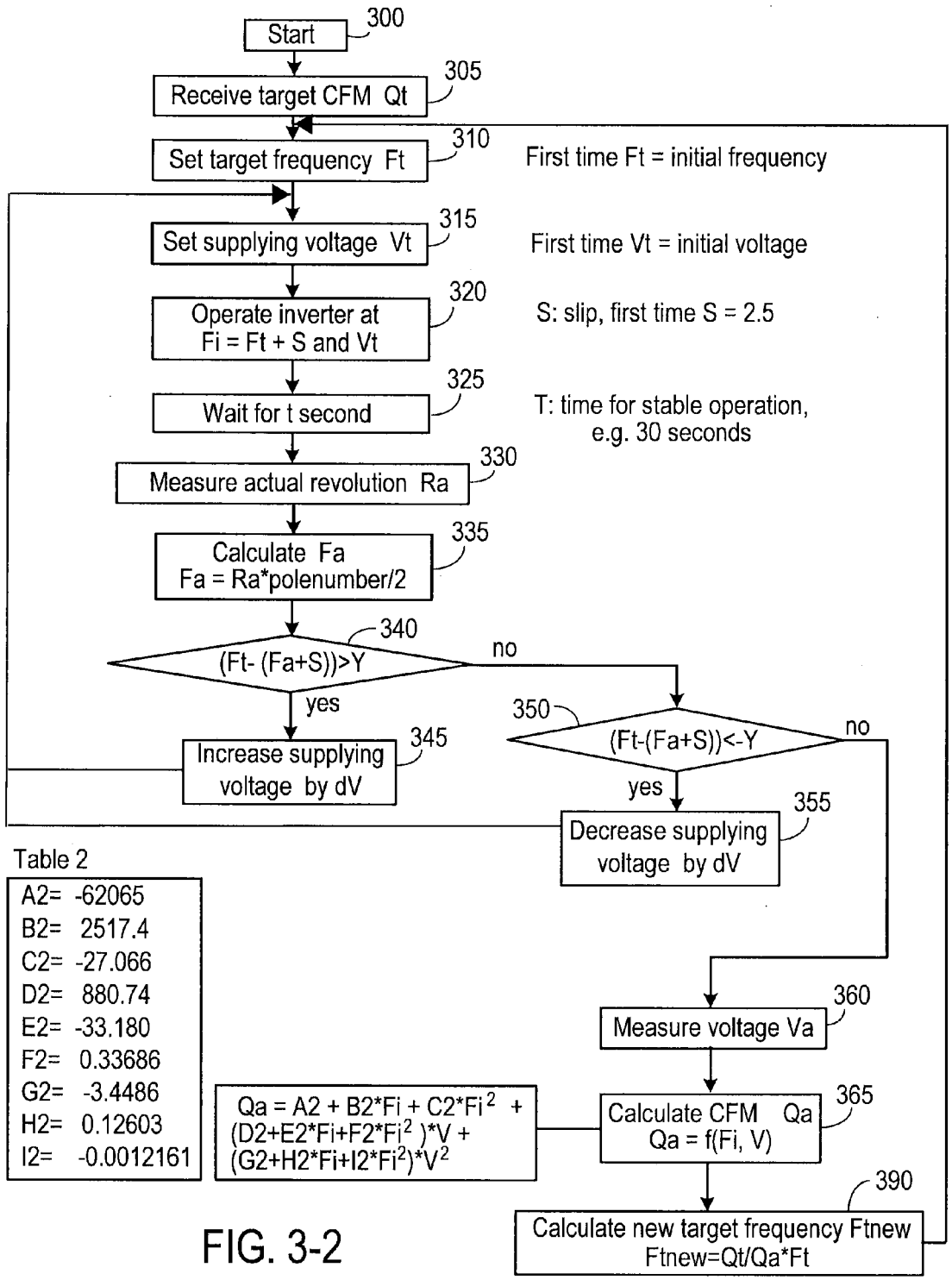

FIG. 3-1 shows a flow diagram of fixed slip by voltage control of one preferred embodiment of the present invention. It starts with block 300 with the first step 305 where target air flow rate, $Q_t$ is received. In step 310, an initial frequency, $F_t$ is set which can be any initial target frequency or a final frequency in the last operation. In step 315, an initial voltage, $V_t$ is set which can be any initial target voltage or a final voltage in the last operation. In step 320 the inverter operates at $F_i = F_t + S$ and $V_t$ where the slip is fixed at a preset value eg. 3.0 Hz in which motor operates at a good efficiency. In the next step 325, the air flow control module 35 waits for t seconds which is time taken for motor speed to be stable before taking step 330 in measuring the motor revolution, $R_a$. This is followed by step 335 where the actual frequency, $F_a$ is calculated. Then step 340 follows where if $F_i-(F_a+S)>Y$ then step 345 takes place where the supply voltage is increased by dV, otherwise step 350 takes place where if $F_i-(F_a+S)<-Y$, then step 355 takes place where supply voltage is decreased by dV. Y is desired tolerance of frequency. After step 345 or step 355, the microprocessor 100 returns to step 315 to set the supply voltage, $V_1$ and repeat the cycle again. If $|F_i-(F_a+S)|<=Y$, then step 360 takes place where actual voltage, $V_a$ is measured. Next step 385 follows where the air flow rate, $Q_a$ is calculated using frequency, $F_i$ and voltage, $V_a$ using the following algorithm:

$$Q_a = A2 + B2*Fi + C2*Fi^2 + (D2 + E2*Fi + F2*Fi^2)*V + (G2 + H2*Fi + I2*Fi^2)*V^2$$

wherein $Q_a$ is the actual air flow rate signal, $F_i$ is the present value of the motor frequency, V is the supply voltage and A2 to I2 are constants shown in Table 2 representing characteristics of the blower 20, the motor 25 and the variable speed motor controller 30.

This is followed by step 370 where the microprocessor 100 compares a target air flow rate signal, $Q_t$ with the actual air flow rate signal $Q_a$. If $Q_t-Q_a>X$ then step 375 an increase in target frequency dF takes place otherwise, step 380 takes place where if $Q_t-Q_a<-X$ step 385 a decrease in target frequency dF takes place. If $|Q_t-Q_a|<=X$, then step 310 is repeated and the target frequency $F_t$ is set and the cycle is repeated. X is the desired tolerance of air flow rate. Steps 375 and 385 are also followed by step 310.

Steps 370 to 385 can be reduced to one-step 390 where new target frequency, $F_t$ is calculated using the following algorithm: $F_{tnew} = Q_t/Q_a * F_t$ as shown in FIG. 3-2 in this algorithm, $Q_a$ is calculated by $F_i$ and $V_a$ but if input of inverter is used instead of voltage $V_a$ the same results can be achieved. Generally, 3 phase induction motor has a good efficiency at slip 1 to 4 Hz, so to preset value S, 1 to 4 Hz causes good efficiency operation. If motor revolution $R_a$ is used in $Q_a$ calculation algorithm instead of $F_i$ the same results can be achieved.

Figures 1, 4:
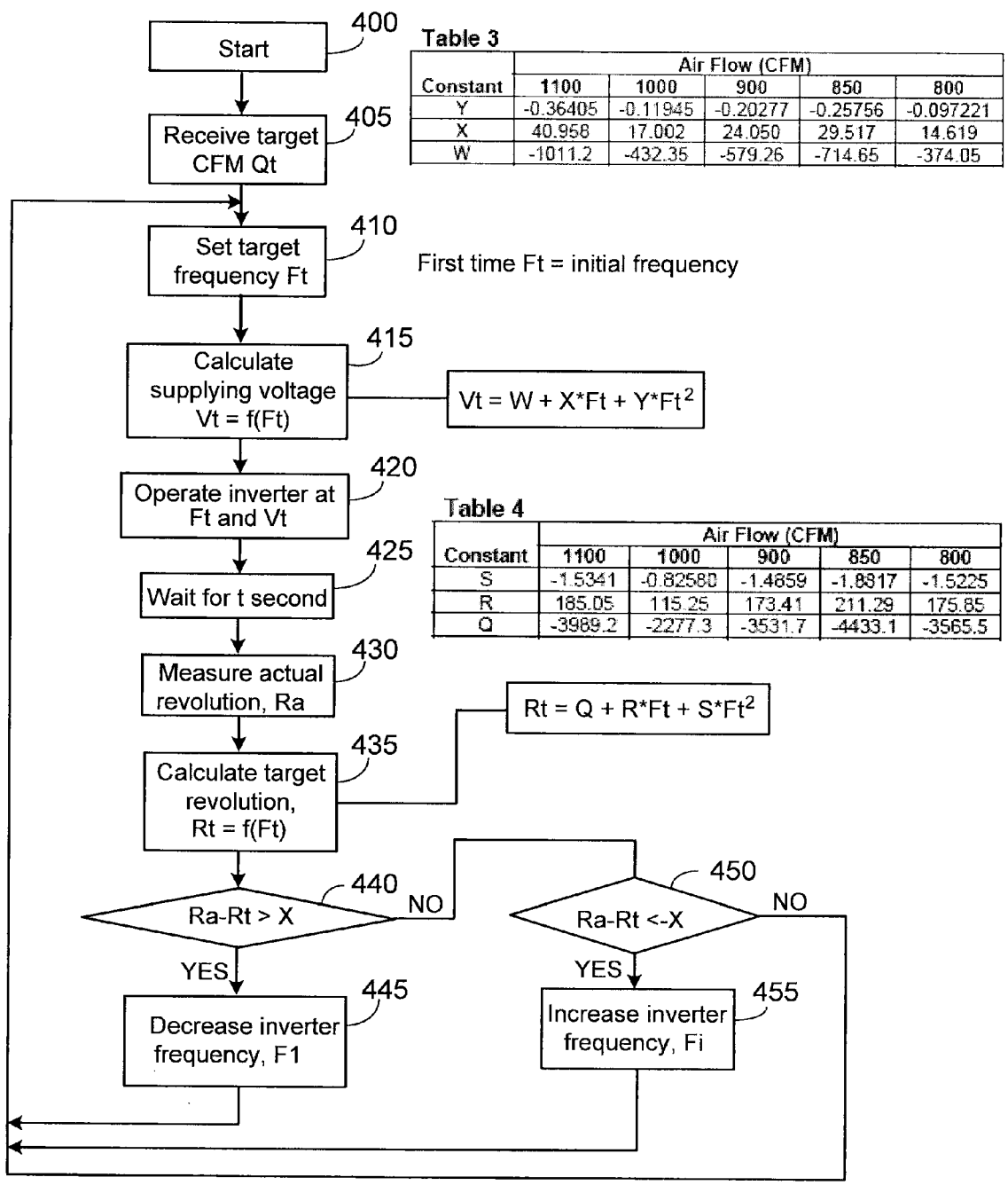
Figures 2, 4:
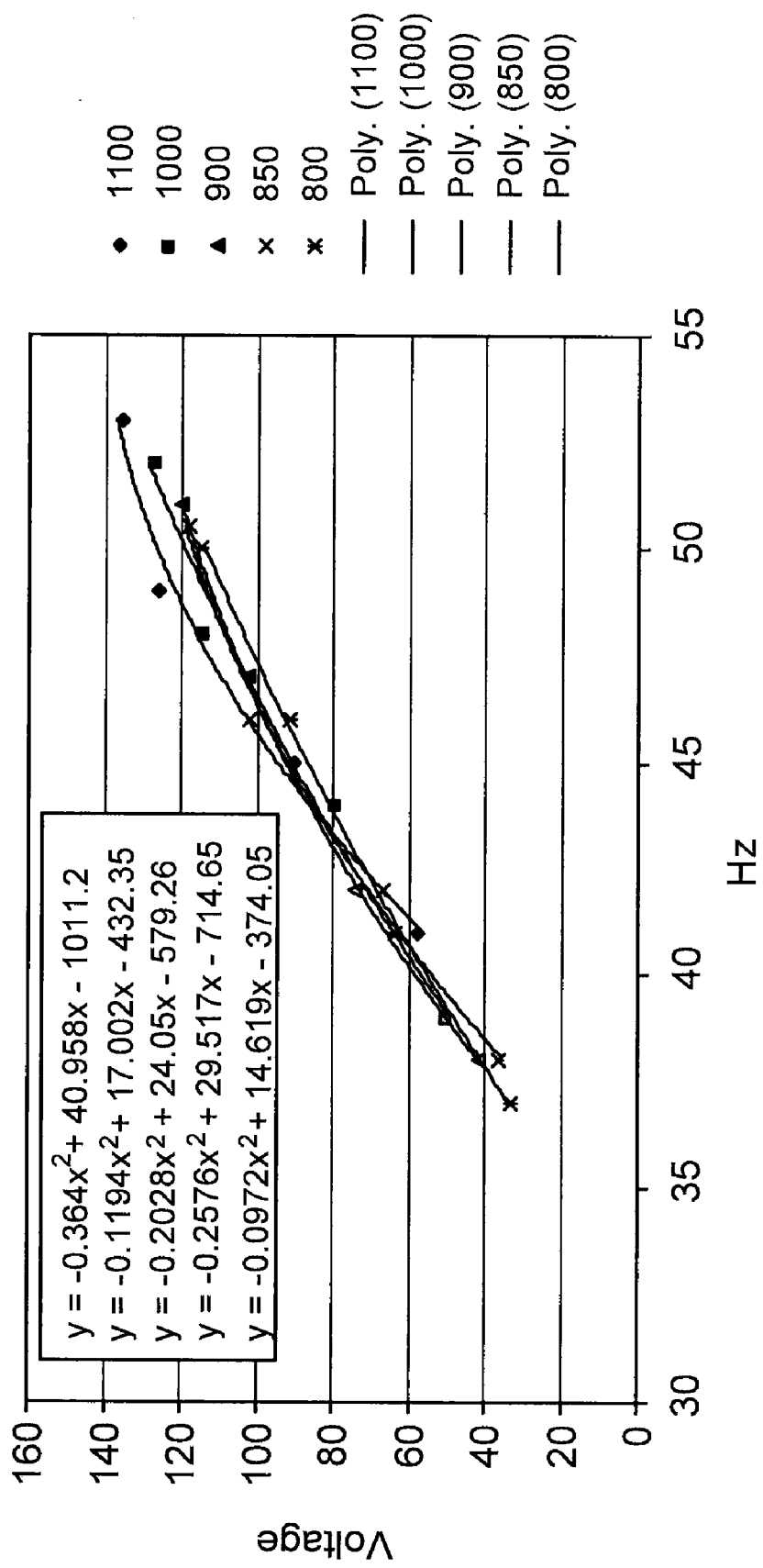
Figures 3, 4:
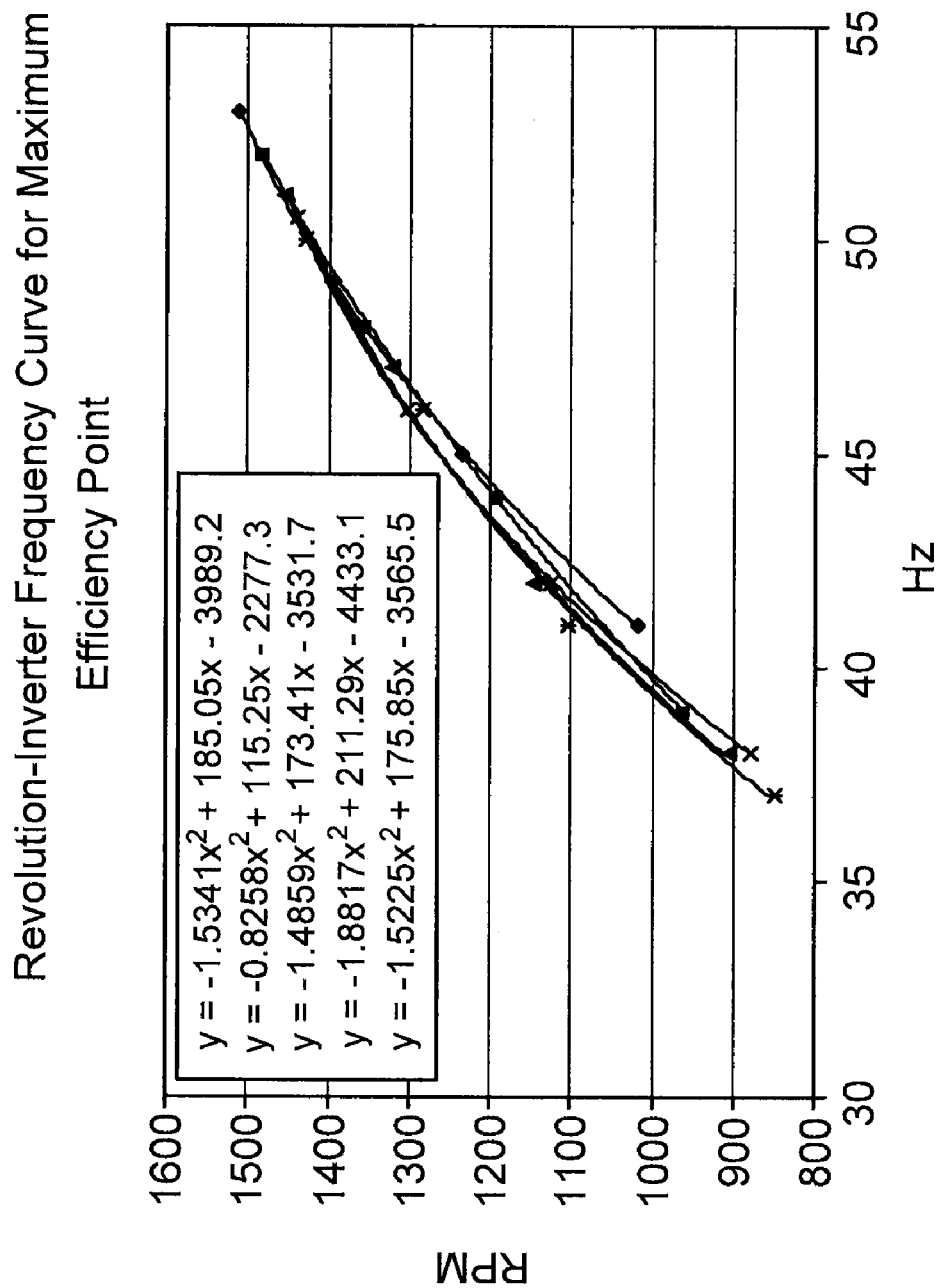

FIG. 4-1 is a flow diagram of maximum efficiency point of one preferred embodiment of the present invention. All the data used to develop this algorithm are maximum efficiency points where the required air flow rate $Q_a$ is achieved using the least input power W. It starts with block 400 with the first step 405 where target air flow rate, $Q_t$ is received. In step 410, an initial frequency, $F_t$ is set which can be any initial target frequency or a final frequency in the last operation. In step 415, voltage, $V_t$ is calculated from the $V_t$-$F_t$ curve shown in FIG. 4-2 and the $V_t$-$F_t$ curve is shown by the equation $$Vt = W + X*Ft + Y*Ft^2$$

where W, X and Y are constants shown in Table 3.

These curves show the relationship between voltage, $V_t$ and frequency, $F_t$ at maximum efficiency within their operation range of static pressure. Each of these curves represents one target air flow rate. In step 420 the inverter operates at $F_t$ and $V_t$. Next step 425 takes place where the air flow control module 35 waits for t seconds which is time taken for motor speed to be stable before taking step 430 in measuring the actual motor revolution, $R_a$. This is followed by step 435 where the target motor revolution $R_t$ is calculated using the $R_t$-$F_t$ curve shown in FIG. 4-3 and the $R_t$-$F_t$ curve equation is☐ $R_t = Q + R*F_t + S*F_t^2$ where Q, R and S are shown in Table 4. These curves show the relationship between motor revolution, $R_a$ and frequency, $F_t$ at maximum efficiency within their operation range of static pressure. Each of these curves represents one target air flow rate. Then step 440 follows where if $R_a - R_t > X$ or when actual air flow rate is higher than target air flow rate, $Q_t$ step 445 takes place where the inverter frequency $F_i$ is decreased, and step 410 follows where the inverter frequency is set and the cycle is repeated, otherwise step 450 takes place where if $R_a - R_t \leq -X$ or when actual air flow rate is less than target air flow rate then step 455 takes place where inverter frequency $F_i$ is increased followed by step 410 where the inverter frequency is set and the cycle is repeated. When |Ra−Rt|<=X where no adjustment to the inverter frequency is made step 410 takes place and the cycle is repeated. X is the desired tolerance of the motor revolution.

Thus the present invention provides an improved system and method for conditioning air and for maintaining a preselected air flow rate of the conditioned air through at least part of the system regardless of the static pressure therein for use in conjunction with numerous duct systems without the need for calibration particular to the specific duct system using induction motor and AC inverter controller.

The invention claimed is:

1. An apparatus for controlling an air distribution system of the type which includes a duct system, a motor drivingly associated with a blower and a target air flow rate signal which represents a target air flow for the air distribution system, the apparatus providing control of the motor speed to maintain a rate of air flow in the system at substantially the target air flow rate, characterised in that the apparatus comprises:
   a microprocessor means to determine a target frequency and supplied voltage signal in response to a combination of one or more of the following: speed signal, load signal, provisional frequency signal, target air flow rate and target motor revolution signal, whether received, sent or calculated by the microprocessor for setting the air flow rate according to the target air flow rate;
   a controller means to control a supplied frequency to the motor to achieve a provisional frequency specifying a particular frequency of the motor, and to control the supplied voltage signal, supplied to the controller means from an air flow control module, to achieve a provisional voltage signal;
   another controller means to receive the target air flow and provide the target air flow to the microprocessor;
   sensing means to detect a speed signal representative of the speed of the motor and means to provide the speed signal to the microprocessor;
   another sensing means to detect the load signal representative of the load of the motor and means to provide the load signal to the microprocessor;
   means for calculating a slip signal by using the speed signal and the frequency signal; and
   wherein the air flow control module controls the supplied voltage signal in response to the slip signal.

2. The apparatus as recited in claim 1, wherein the supplied voltage signal is representative of the input voltage of the motor.

3. The apparatus as recited in claim 1 wherein the supplied voltage signal is controlled for maintaining the slip signal at a previously set value.

4. The apparatus as recited in claim 1 wherein the provisional frequency applies to a frequency of current operation.

5. The apparatus as recited in claim 1 wherein the provisional frequency applies to a frequency at which the motor operated the last time.

6. The apparatus as recited in claim 3 wherein the previously set value is a value from 1 Hz to 4 Hz.

7. The apparatus as recited in claim 1 wherein the load signal is a slip of an induction motor.

8. The apparatus as recited in claim 1 wherein the load signal applies to an input of an inverter.

9. The apparatus as recited in claim 1, wherein the supplied voltage signal is not controlled and varies according to the frequency signal.

10. The apparatus as recited in claim 1, wherein the supplied voltage signal is determined by calculation using provisional frequency.

11. The apparatus as recited in claim 1, wherein the target motor revolution is determined by calculation using provisional frequency.

12. The apparatus as recited in claim 1, wherein the sensing means can be a hall sensor or optic sensor.

13. The apparatus as recited in any of claims 2-8 wherein the apparatus controlling the motor speed to maintain a rate of airflow in the system by way of using fixed slip by voltage control.

14. The apparatus as recited in claim 13, wherein the apparatus is used for applying to a combination of induction motor and alternating current (AC) inverter controller.

15. The apparatus as recited in any of claims 2, 4, 5, 7, 8 and 9, wherein the apparatus controlling the motor speed to maintain a rate of an airflow in the system by way of fixed voltage frequency characteristic.

16. The apparatus as recited in claim 15, wherein the apparatus is used for applying to a combination of induction motor and alternating current (AC) inverter controller.

17. The apparatus as recited in any of claims 2, 4, 5, 7, 8, 10 and 11, wherein the apparatus providing control of the motor speed to maintain a rate of an air flow in the system at substantially the target air flow rate is conducted at a maximum efficiency within an operation range of static pressure.

18. The apparatus as recited in claim 17, wherein the apparatus is used for applying to a combination of induction motor and alternating current (AC) inverter controller.

19. The apparatus as recited in any of claims 1-8, 9 and 10-12, wherein the apparatus is used for applying to a combination of induction motor and alternating current (AC) inverter controller.

* * * * *